UNITED STATES PATENT OFFICE 2,295,257

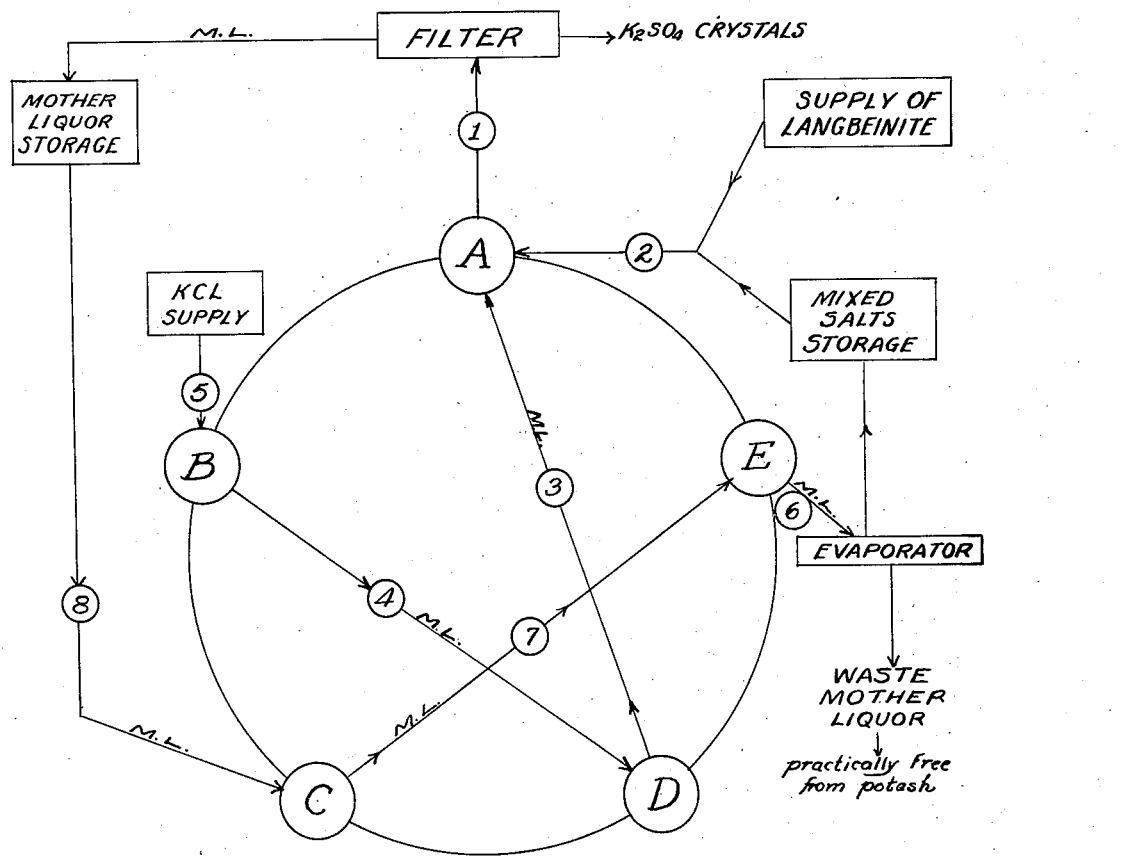

PROCESS OF PRODUCING POTASSIUM SULPHATE

Charles A. Butt, Atlanta, Ga., and Jacob Frank, Carlsbad, N. Mex., assignors to International Agricultural Corporation, New York, N. Y., a corporation of New York Application December 15, 1938, Serial No. 245,892

5 Claims. (Cl. 23—121)

This invention relates to the treatment of potassium bearing double salts for the purpose of recovering potash therefrom. In carrying out this invention a potassium containing double salt is treated with a potassium compound which will remove a portion or all of one of the constituents of the double salt and produce a product containing a larger amount of the desired potassium compound.

The invention will be described with particular reference to the treatment of langbeinite ($K_2SO_4.2MgSO_4$) with potassium chloride, KCl, to produce potassium sulphate, $K_2SO_4$.

The reaction is represented thus:

$$K_2SO_4.2MgSO_4 + 4KCl \rightleftarrows 3K_2SO_4 + 2MgCl_2$$

However, if half as much KCl is used the reaction is:

$$2(K_2SO_4.2MgSO_4) + 2KCl \rightleftarrows 3(K_2SO_4.MgSO_4) + MgCl_2$$

The potassium magnesium sulphate $$K_2SO_4.MgSO_4$$

can be treated with more potassium chloride thus:

$$3(K_2SO_4.MgSO_4) + 6KCl \rightleftarrows 6K_2SO_4 + 3MgCl_2$$

It has been found in attempts to produce potassium sulphate in accordance with the above reactions, that if the theoretical amount of potassium chloride is added to langbeinite the reactions proceed slowly and may not be completed even after long periods of stirring the materials in solution.

In accordance with the present invention a considerable excess of KCl over the theoretical amount needed may first be used for treating a batch of langbeinite. In this way practically all of the $MgSO_4$ of that batch is converted into $MgCl_2$ in a short time as the reaction proceeds to completion. About 10% excess to about 35% excess of KCl has been found to be sufficient to carry the conversion of the magnesium sulphate in langbeinite to substantial completion in about three or four hours depending upon such factors as fineness of grinding of the material and the temperature used.

In view of the fact that an excess of KCl solution is necessary for the rapid and complete conversion of langbeinite to potassium sulphate, the resulting magnesium chloride mother liquor drawn from the potassium sulphate crystals contains a substantial amount of potash which would be lost if it were not recovered therefrom. The result would be a low recovery, as sulphate of potash, of the total amount of potash contained in the langbeinite and potassium chloride that is used.

In order to avoid too great a waste of potassium in the mother liquor from which potassium sulphate is obtained by treating langbeinite with potassium chloride this mother liquor is used by the present invention to treat charges of langbeinite in succession in such a way that the mother liquor having a high $K_2O$ content contacts with langbeinite from which a part of the $MgSO_4$ has been removed, the mother liquor from this treatment having a smaller $K_2O$ content contacts with langbeinite from which a smaller amount of magnesium sulphate has been removed and so on in a succession of steps, until finally the mother liquor, substantially free from $K_2O$, is either discarded or is evaporated to recover the remaining $K_2O$ after its use in treating fresh langbeinite. Three such steps have been found to be sufficient for the recovery of the major portion of the potash from the mother liquors but five or possibly more such steps are sometimes advisable.

The invention will be described in connection with an arrangement of treating tanks and other apparatus diagrammatically illustrated in the accompanying drawing in which the reference characters A, B, C, D and E indicate a series of five treating tanks or agitators, legends indicate other apparatus, the numerals within circles indicate a sequence of steps that is followed after the process has started, lines with arrows indicate direction of movement of materials, and M. L. means mother liquor. It is to be understood that a valved pipe or other convenient means for transfer of liquids extends from the supply of KCl solution and also from the mother liquor storage to each tank A, B, C, D and E and also from these tanks to the evaporator and from each tank to other tanks as needed for transferring mother liquor as described below for a series of runs for production purposes, and that each tank is provided with a stirrer or agitator and with heating means.

In order to start the process each tank A, B, C, D and E is charged with pulverized langbeinite and there is added to tank A a sufficient amount of KCl aqueous solution above the theoretical amount needed, say about 25% excess, to convert substantially all of the magnesium sulphate in this tank into potassium sulphate in about four hours or less. Water, or mother liquor from previous runs when the same is available, is added to each of the other tanks in amounts about equal to the KCl solution. Mother liquor from other runs is preferable to the water when available. The contents of the tanks are stirred and left to settle and after time enough has elapsed for the reaction of the KCl with the langbeinite to take place the following steps are taken.

In order to start the process, equal amounts of langbeinite are added to the five tanks. The KCl solution that is added in excess to tank A causes the reactions forming the potassium sulphate to be completed within a reasonable time. Water in amount about equal to the KCl solution is added to each of the other tanks.

*Step 1.*—The total contents of tank A are filtered, or centrifuged, to separate the potassium sulphate, which is then sent to a dryer and storage. The filtered mother liquor is transferred to the mother liquor storage tank.

*Step 2.*—The same quantity of fresh langbeinite as was originally added to each tank is added to tank A. The mixed salts that are recovered in Step 6 are added to tank A along with the charge of langbeinite in succeding runs. The treatment of a batch of langbeinite as described above is a convenient way of proceeding with the process. By the end of about the 10th batch, or cycle, the salts and mother liquors reach substantial equilibrium. The batches, or cycles are repeated with continuous production of sulphate of potash.

*Step 3.*—The mother liquor in tank D is pumped or siphoned into tank A.

*Step 4.*—The mother liquor in tank B is pumped or siphoned into tank D.

*Step 5.*—KCl solution, in amount equal only to the theoretical quantity necessary to convert the $MgSO_4$ contained in the langbeinite to $MgCl_2$ is added to tank B.

*Step 6.*—The mother liquor from tank E is pumped to the evaporator, concentrated, and further recovery of potash is made thereby, in the form of mixed salts.

*Step 7.*—The mother liquor in tank C is pumped or siphoned into tank E.

*Step 8.*—The mother liquor in the storage tank is pumped or siphoned into tank C.

The process proceeds as follows to finish a cycle, which is repeated as long as desirable.

For the next run, which is the second run of the cycle, the tanks A, B, C, D, and E are in effect moved clockwise one step or position by proper adjustment of the valves in the valved pipes mentioned above, and then the contents of tank B are removed and filtered to separate the potassium sulphate, immediately thereafter langbeinite and mixed salts are fed to tank B, (which in Fig. 1 of the drawing is then in the position of tank A) the mother liquor in tank E (now in position D) is transferred to tank B, the mother liquor in tank C (in position B) is transferred to tank E, potassium chloride brine is fed to tank C, the mother liquor is removed from tank A (in position E) and evaporated to recover salts, the mother liquor in tank D (in position C) is transferred to tank A, and mother liquor is transferred from the storage tank to tank D.

For the next run, which is the third run of the cycle, the tanks are in effect moved clockwise another step and then the contents of tank C (now in A position) are removed and filtered to separate the potassium sulphate, immediately thereafter langbeinite and mixed salts are fed to tank C, the mother liquor in tank A is transferred to tank C, the mother liquor in tank D is transferred to tank A, potassium chloride brine is fed to tank D, the mother liquor is removed from tank B and evaporated to recover salts, the mother liquor in tank E is transferred to tank B, and mother liquor is transferred from the storage tank to tank E.

For the next run, which is the fourth run of the cycle, the tanks are in effect moved clockwise another step and then the contents of tank D (now in A position) are removed and filtered to separate the potassium sulphate, langbeinite and mixed salts are fed to the tank D, the mother liquor in tank B is transferred to tank D, the mother liquor in tank E is transferred to tank B, potassium chloride brine is fed to tank E, the mother liquor is removed from tank C and evaporated to recover salts, the mother liquor in tank A is transferred to tank C, and mother liquor is transferred from the storage tank to tank A.

For the next run, which is the fifth run of the cycle, the tanks are in effect moved another step and then the contents of tank E (now in A position) are removed and filtered to separate the potassium sulphate, langbeinite and mixed salts are fed to tank E, the mother liquor in tank C is transferred to tank E, the mother liquor in tank A is transferred to the tank C, potassium chloride brine is introduced into tank A, the mother liquor is removed from tank D and evaporated to recover salts, the mother liquor in tank B is transferred to tank D, and mother liquor is transferred from the storage tank to tank B.

This completes the cycle of five runs, and the next run is identical with the first run described above where the eight steps are numbered and described.

The complete cycle of five runs with eight steps in each run is also shown in the following table in which the horizontal lines indicate the steps in the respective runs of which there are five to complete a cycle. The sixth run would be the same as the first one in this table, the seventh the same as the second, and so on as long as the process is continued. Equilibrium is reached after several cycles. In this table "LBN" means "langbeinite," "ML" means "mother liquor," "MS" means "mixed salts," "Evp" means "evaporator," and "St." means "storage tank."

|  | Steps | | | | | | | |
| --- | --- | --- | --- | --- | --- | --- | --- | --- |
|  | 1 | 2 | 3 | 4 | 5 | 6 | 7 | 8 |
| 1st run | Filter $K_2SO_4$ from A. | LBN and MS to A. | ML from D to A. | ML from B to D. | KCL to B. | ML from E to Evp. | ML from C to E. | ML from St. to C. |
| 2nd run | Filter $K_2SO_4$ from B. | LBN and MS to B. | ML from E to B. | ML from C to E. | KCL to C. | ML from A to Evp. | ML from D to A. | ML from St. to D. |
| 3rd run | Filter $K_2SO_4$ from C. | LBN and MS to C. | ML from A to C. | ML from D to A. | KCL to D. | ML from B to Evp. | ML from E to B. | ML from St. to E. |
| 4th run | Filter $K_2SO_4$ from D. | LBN and MS to D. | ML from B to D. | ML from E to B. | KCl to E. | ML from C to Evp. | ML from A to C. | ML from St. to A. |
| 5th run | Filter $K_2SO_4$ from E. | LBN and MS to E. | ML from C to E. | ML from A to C. | KCl to A. | ML from D to Evp. | ML from B to D. | ML from St. to B. |

It will be understood from the foregoing description that after fresh langbeinite is put in tank A and mother liquor from tank D is added thereto, tank A assumes the position or status of tanks E, D, C and B successively, in which positions the mother liquor in contact with the langbeinite is siphoned off and replaced with mother liquor from some other tank in such manner that, as the $K_2O$ content of the mother liquor decreases, the mother liquor successively meets solids having increasing content of langbeinite. Langbeinite is only added where a tank is in the status of tank A, and is treated with mother liquors of progressively increasing $K_2O$ content. Each of the five tanks is successively put through a certain series of steps from the first step of feeding the charge of fresh langbeinite and mixed salts and mother liquor from D to the final step of treating with KCl solution and then filtering off $K_2SO_4$ crystals. For instance, after allowing the mother liquor from tank D containing only a small proportion of $K_2O$ to remain in contact with the solids consisting of fresh langbeinite and mixed salts for a certain period, this mother liquor is later siphoned off at E to the evaporator and is replaced with mother liquor from C, and so on through a succession of treatments until the strong or fresh KCl solution after contact with langbeinite that has been largely exhausted is separated by filtration to give $K_2SO_4$ crystals, and is sent to mother liquor storage.

It has been found in the practice of this process that by using the evaporator to concentrate the end mother liquor obtained from the series of tanks and returning the salts obtained therefrom to the system about 96% or more of the potassium that was introduced into the system in the langbeinite and the potassium chloride is recovered in the potassium sulphate when the process is carried on with heating of the tanks in the A, B and C positions and cooling of the tanks in the D and E positions when the connections are as shown on the drawing. Even without the evaporator or recovery of potassium from the end mother liquor that is drawn from tank E and without the heating of some tanks and cooling of others, about 85% of the total potassium is recovered.

A fresh charge of langbeinite passes through a series of steps, as follows, after the process has been started:

Fresh langbeinite and mixed salts recovered from the evaporated mother liquor are introduced into the emptied tank A and treated with mother liquor from tank D which is practically exhausted with respect to KCl by reason of having already treated four batches of langbeinite of successively greater concentrations. Then tank A assumes the position of tank E and the mother liquor is drawn off to the evaporator. The slightly or partially exhausted langbeinite in tank A (now in tank E position) is then treated with mother liquor from tank C which is a solution less exhausted with respect to KCl than the first as it had treated only three batches of langbeinite of successively greater concentrations. Then tank A assumes the position of tank D and the mother liquor is drawn off to the tank in the A position. The twice partially exhausted langbeinite in tank A (now in tank D position) is then treated with mother liquor from tank B which is a solution less exhausted with respect to KCl than the second as it had treated only two batches of langbeinite of successively greater concentrations. Then tank A assumes the position of tank C and the mother liquor is drawn off to the tank in the E position. The thrice partially exhausted langbeinite in tank A (now in tank C position) is then treated with motor liquor from the mother liquor storage which is a stronger solution with respect to KCl than the third as it had treated only one batch of thrice partially exhausted langbeinite. Then tank A assumes the position of tank B and the mother liquor is drawn off to tank D. The partially exhausted langbeinite in tank A (now in tank B position), after the four treatments just described, is then treated with a solution of KCl. The tank A then assumes its position A and the contents thereof is transferred to the filter, thus completing the run.

The process is somewhat of the nature of a counter current process as the fresh langbeinite first comes into contact with nearly spent mother liquor and then progressively into contact with stronger mother liquor or mother liquor having more KCl therein, while the KCl solution first comes into contact with nearly spent langbeinite and then progressively into contact with less spent batches of langbeinite.

It has been found in practicing this process that while an excess of about 30% over the theoretical amount of KCl is needed in the first tank when starting the process in order to obtain a highly pure potassium sulphate salt quickly, this excess KCl is not lost as it passes in the mother liquor from the tank into which it is introduced into other tanks where it reacts with batches of langbeinite that are less and less spent or contain more and more $MgSO_4$. Although only the theoretical amount of KCl is added after the process has been started, an excess of it is present in the tank into which it is introduced so that the desired reaction does not require an excessive amount of time.

When it is desired to produce the mixed salt, sulphate of potash magnesia $K_2SO_4.MgSO_4$, instead of potassium sulphate, $K_2SO_4$, by this process this can be done by decreasing the amount of KCl that is introduced into tank B.

It has been found that it is not always necessary to use five tanks or agitators as the langbeinite can be rapidly converted into potassium sulphate by using three tanks provided the salts are separated from the mother liquors between batches.

What is claimed is:

1. The process of producing potassium sulphate, which comprises treating langbeinite that has been largely exhausted with a solution of potassium chloride, to produce potassium sulphate in solid form and a mother liquor containing magnesium chloride, separating potassium sulphate thus formed from the mother liquor, treating with said resulting mother liquor langbeinite that has been less exhausted thus producing more of said largely exhausted langbeinite and a different mother liquor, treating fresh langbeinite with said last named mother liquor to produce more of said less exhausted langbeinite, withdrawing from the process the mother liquor resulting from the said last named treatment, concentrating and cooling said withdrawn mother liquor to crystallize potash salts therein, separating said potash salts and returning the same to the process with fresh langbeinite, and discarding the mother liquor resulting from said concentrating and cooling step.

2. The process in accordance with claim 1, in which the solution of potassium chloride is in excess of the theoretical amount needed to convert the magnesium sulphate in said langbeinite that has been largely exhausted into potassium sulphate and magnesium chloride.

3. The process in accordance with claim 1, in which the first step is carried out an an elevated temperature.

4. The process in accordance with claim 1, in which the first step is carried out an elevated temperature and with an amount of a solution of potassium chloride in excess of the theoretical amount required to convert the magnesium sulphate in said langbeinite that has been largely exhausted into potassium sulphate and magnesium chloride.

5. The process in accordance with claim 1, in which the first step is carried out at an elevated temperature and with an amount of a solution of potassium chloride in excess of the theoretical amount needed to convert the magnesium sulphate in said langbeinite that has been largely exhausted into potassium sulphate and magnesium chloride and the mother liquor is withdrawn from the fresh langbeinite after cooling.

JACOB FRANK.
CHARLES A. BUTT.